US006788021B2

(12) United States Patent
Sozer et al.

(10) Patent No.: US 6,788,021 B2
(45) Date of Patent: Sep. 7, 2004

(54) CONTROL METHOD FOR SWITCHED RELUCTANCE MOTOR

(75) Inventors: Yilmaz Sozer, Troy, NY (US); David A. Torrey, Ballston Spa, NY (US); Erkan Mese, Izmit (TR)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/109,005

(22) Filed: Mar. 29, 2002

(65) Prior Publication Data

US 2003/0193309 A1 Oct. 16, 2003

(51) Int. Cl.$^7$ .............................. H02P 5/28; H02P 3/00; H02P 7/36
(52) U.S. Cl. ..................... 318/701; 318/705; 318/703
(58) Field of Search .................................. 318/701, 140, 318/700, 705, 703, 696; 322/24

(56) References Cited

U.S. PATENT DOCUMENTS

| | | | |
|---|---|---|---|
| 4,370,580 A | * 1/1983 | Burgbacher | ............... 310/67 R |
| 4,618,808 A | 10/1986 | Ish-Shalom et al. | |
| 4,707,650 A | * 11/1987 | Bose | .......................... 318/685 |
| 4,739,240 A | 4/1988 | MacMinn et al. | |
| 4,835,448 A | 5/1989 | Dishner et al. | |
| 4,933,620 A | 6/1990 | MacMinn et al. | |
| 4,959,596 A | 9/1990 | MacMinn et al. | |
| 5,012,172 A | * 4/1991 | Sember | ........................ 318/696 |
| 5,168,202 A | 12/1992 | Bradshaw et al. | |
| 5,789,893 A | 8/1998 | Watkins | |
| 5,841,262 A | 11/1998 | Tang | |
| 5,864,218 A | 1/1999 | Orthmann | |
| 5,977,740 A | 11/1999 | McCann | |
| 6,011,377 A | * 1/2000 | Heglund et al. | ............ 318/701 |
| 6,014,003 A | 1/2000 | French | |
| 6,046,561 A | 4/2000 | Zup et al. | |
| 6,051,942 A | 4/2000 | French | |
| 6,288,514 B1 | 9/2001 | Direnzo et al. | |
| 2003/0011347 A1 | * 1/2003 | Kaplan et al. | ................. 322/24 |

FOREIGN PATENT DOCUMENTS

JP 2000261910 A * 9/2000 ........... B60L/11/18

OTHER PUBLICATIONS

Lawrenson et al., "Variable–speed switched reluctance motors", IEE Proc, vol. 127, PT. B, No. 4, pp. 253–265, Jul. (1980).
Torrey et al., "Modelling a nonlinear variable–reluctance motor drive", IEE Proceedings, vol. 137, Pt. B, No.5, pp. 314–326, Sep. (1990).
Russa et al., "A Self–Tuning Controller for Switched Reluctance Motors", IEEE Transactions on Power Electronics, vol. 15, No. 3, pp. 545–552, May (2000).
Fahmi et al., "Self–tuning Control Switched Reluctance Motors for Optimized Torque per Ampere at all Operating Points", Texas A&M University, Department of Electrical Engineering, pp. 778–783, (1998).

* cited by examiner

Primary Examiner—Robert Nappi
Assistant Examiner—Patrick Miller
(74) Attorney, Agent, or Firm—Liniak, Berenato & White

(57) ABSTRACT

A control algorithm provides automatic control of the turn-on angle used to excite the switched-reluctance motor (SRM). The control algorithm determines the turn-on angle that supports the most efficient operation of the motor drive system, and consists of two pieces. The first piece of the control technique monitors the position of the first peak of the phase current ($\theta_p$) and seeks to align this position with the angle where the inductance begins to increase ($\theta_m$). The second piece of the controller monitors the peak phase current and advances the turn-on angle if the commanded reference current cannot be produced by the controller. The first piece of the controller tends to be active below base speed of the SRM, where phase currents can be built easily by the inverter and $\theta_p$ is relatively independent of $\theta_m$. The second piece of the controller tends to be active above base speed, where the peak of the phase currents tends to naturally occur at $\theta_m$, regardless of the current amplitude. The two pieces of the controller naturally exchange responsibility as a result of a change in command or operating point.

18 Claims, 13 Drawing Sheets

CONTROL METHOD FOR SWITCHED RELUCTANCE MOTOR

BACKGROUND OF THE INVENTION

1. Field of the Invention

The present invention relates to switched reluctance motors for motor vehicles in general, and more particularly to an automatic control of the turn-on angle used to excite the switched-reluctance motor.

2. Description of the Prior Art

In the automotive industry there is rapid expansion in the incorporation of electronic and electrical systems for vehicle control, passenger comfort and safety, pollution reduction and economy of production, running and maintenance. The modern road vehicle relies heavily on electric motors (and drives); this dependency will inevitably increase, but requires an alternative to the convenient but costly a/c or d/c electrical motors. The current trend in electric motor control is to design low cost, highly energy efficient and highly (time) reliable systems.

Automotive electronic systems, particularly those associated with the engine compartment, must operate under difficult environmental conditions (temperature extremes, vibration, EMI, dirt mixed with oil, moisture and gas). It is necessary to cope with these conditions using good engineering practice and design.

The switched-reluctance motor (SRM) produces torque through excitation that is synchronized to rotor position. The simplest excitation strategy for the SRM is generally described by three excitation parameters: the turn-on angle $\theta_{on}$, the turn-off angle $\theta_{off}$, and the reference current $I_{ref}$. A control algorithm would typically use the same excitation parameters for each phase, implemented with the spatial shift consistent with the symmetrically displaced phase structure. Control of the excitation angles results in either positive net torque for motoring, or negative net torque for generating. Basic operation of the SRM is given in several articles, such as "Variable-speed switched reluctance motors", P. J. Lawrenson, et al., IEE Proc., Vol. 127, pt. B, no. 4, pp. 253–265, 1980; "Switched Reluctance Motors and Their Control", T. J. E. Miller, Oxford, 1993; and "Switched Reluctance Motor Drives", R. Krishnan, CRC Press, 2001, which are hereby incorporated by reference.

Efficient operation of the SRM, or any motor drive, is always of importance. Inefficiency leads to larger size, increased weight, and increased energy consumption. In order to maximize SRM efficiency, the need exists to maximize the ratio of the average torque to RMS phase current, $T_{avg}/I_{phrms}$. This ratio captures the intended goal of providing the required electromechanical output with the minimum electrical input. This approach is valid for both drive applications that are tolerant of SRM torque ripple and applications that require extremely smooth torque production, though smooth torque production may require current shaping that cannot be characterized by the single parameter $I_{ref}$.

While the self-tuning approach to optimization of excitation parameters, such as described by "Self-tuning control of switched reluctance motors for optimized torque per Ampere at all operating points" B. Fahimi, et al., Proc. Of the IEEE Applied Power Electronics Conf., pp. 778–783, 1998; and "A self-tuning controller for switched reluctance motors", K. Russa, et al., IEEE Trans. On Power Electronics, Vol. 15, pp. 545–552, 2000; or the approach based on extensive lookup tables is know, this invention seeks to provide an automatic excitation angle control algorithm that supports efficient operation of the SRM over its entire speed region.

Thus, the need exists for a means to control the SRM that is simple, compact, inexpensive, providing better performance and efficiency, and greater reliability over the entire speed region of the SRM.

SUMMARY OF THE INVENTION

The present invention provides an improved control apparatus and method for a switched reluctance motor (SRM) for use with automobiles or other devices utilizing a switched reluctance motor.

Switched reluctance machines (SRM) are brushless d.c. machines, having neither brushes or permanent magnets, thereby minimizing potential maintenance and wear issues. The SRMs are durable and long lasting, with bearing life being the primary wear determinant. The SRMs are typically less expensive to manufacture due to fewer parts and less labor. The overall motor and drive system cost is largely a function of the cost of the electronic drive controller, depending on the level of sophistication required by the application.

Switched reluctance machines operate on the principle that a magnetic field that is created about a component formed from a magnetically permeable material will exert a mechanical force on that component. This mechanical force will urge the component to become aligned with the magnetic flux (lines of force) generated by the magnetic field. Thus, by using the stator to establish and rotate a magnetic field about a rotor formed from magnetically permeable material, the rotor can be driven to rotate relative to the stator. The resistance to the passage of this magnetic flux from the stator to the rotor is referred to as reluctance. The magnitude of this reluctance changes with the rotational position of the rotor relative to the stator. Thus, electric motors of this type are commonly referred to as variable reluctance motors.

Typically, the SRM conventionally comprises a generally hollow cylindrical stator having a plurality of radially inwardly extending poles formed thereon, and a rotor rotatably supported concentrically within the stator and provided with a plurality of radially outwardly extending poles, i.e., SRM is doubly salient. Windings of an electrically conductive wire are provided about each stator pole. However, no electrical conductor windings or permanent magnets are provided on the rotor that consists only of iron laminations. Interconnecting the stator windings forms phase windings. For an SRM with q phases, the coil around every qth stator pole would be connected with alternating magnetic polarity whereby magnetic flux is alternately directed toward the rotor and away from the rotor. SRM phase windings are made with both series and parallel connections of stator coils, according to the intentions of the designer.

Torque is produced by switching current into each of the phase windings in a predetermined sequence that is synchronized with the angular position of the rotor, so that a magnetic force of attraction results between the rotor and stator poles that are approaching each other. Thus, electric machines of this type are commonly referred to as switched reluctance machines. The current is switched off in each phase before the rotor poles nearest the stator poles of the phase rotate past the aligned position. Otherwise, the magnetic force of attraction would produce a negative or braking torque. The torque developed is independent of the direction of current flow so that unidirectional current pulses synchronized with rotor movement can be applied to develop torque in either direction. These pulses are generated by a converter using current switching elements such as thyristors or transistors.

In operation, each time a phase of the switched reluctance motor is switched on by closing a switch in a converter, current flows in the stator winding of that phase providing energy from a direct current (DC) supply to the motor. The energy drawn from the supply is converted partly into mechanical energy by causing the rotor to rotate toward a minimum reluctance configuration and partly in stored energy associated with the magnetic field. After the switch is opened, part of the stored magnetic energy is converted to mechanical output and part of the energy is returned to the DC source.

The switched reluctance machine can be utilized also as a generator. When operated as a generator, the SRM produces current rather than voltage. Braking torque is produced when winding current continues to flow after a rotor pole has passed alignment with an associated stator pole. Because the SRM has no rotor excitation, it is necessary to first draw electric power from a DC bus in order to cause current to begin flowing in windings of the motor. Current can be initiated in the windings either prior to alignment of a rotor pole and associated stator pole or after alignment has occurred. In general, very little torque will be produced by currents that exist when a corresponding rotor pole is adjacent or close to either side of a stator pole. Once the rotor pole passes alignment or continues into the negative torque region, the winding current will build faster than in the motoring region because the inductive term which establishes the voltage across the motor winding becomes negative. While some DC current will still be drawn from the associated DC bus while generating torque is being produced, DC current will be delivered to the bus when the switches actuated to start current into the winding are turned off and force the winding current to commutate into the associated flyback diodes. The net DC current is the sum of all the current from all of the phases of a multi-phase motor and it is this net DC current that is regulated when the reluctance motor is operated as a generator.

This invention presents a new approach to the automatic control of the turn-on angle used to excite the switched-reluctance motor (SRM). The control algorithm determines the turn-on angle that supports the most efficient operation of the motor drive system, and consists of two parts. The first part of the control technique monitors the position of the first peak of the phase current ($\theta_p$) and seeks to align this position with the angle where the inductance begins to increase ($\theta_m$). The second part of the controller monitors the peak phase current and advances the turn-on angle if the commanded reference current cannot be produced by the controller. The first part of the controller tends to be active below base speed of the SRM, where phase currents can be built easily by the inverter and $\theta_p$ is relatively independent of $\theta_m$. The second part of the controller is active above base speed, where the peak of the phase currents tends to naturally occur at $\theta_m$, regardless of the current amplitude. The two parts of the controller naturally exchange responsibility as a result of a change in command or operating point.

Therefore, this invention provides an automatic excitation angle control algorithm that supports efficient operation of the SRM over its entire speed region and provides better performance and efficiency than the current electrical motors.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with reference to accompanying drawings. At the outset, it is noted that this invention is shown and described with reference to an automobile; however, the present invention has many application and uses outside the automotive environment where a SRM is utilized.

Figure 1:
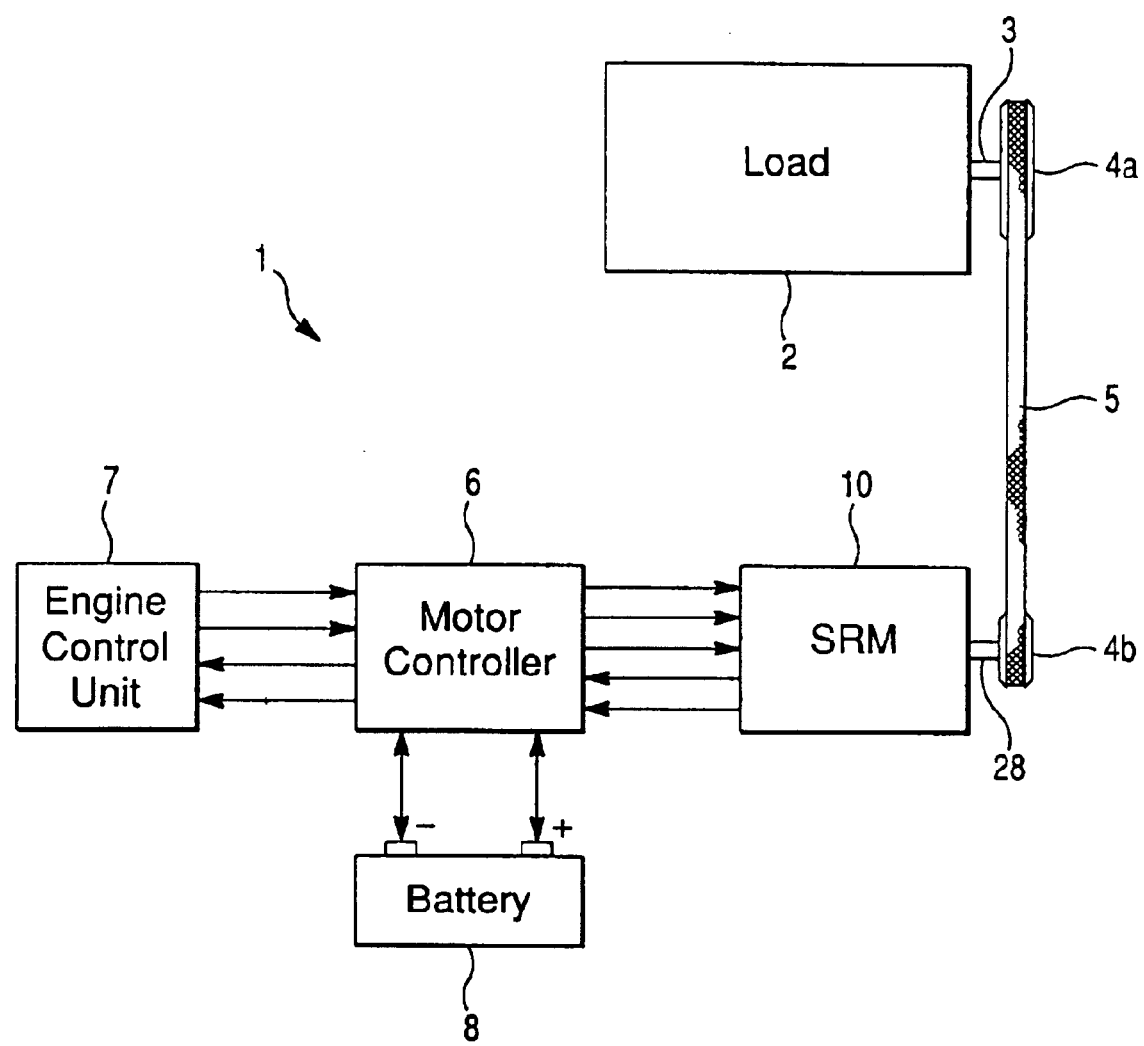
FIG. 1 is a schematic view of a system for providing electrical power for a motor vehicle in accordance with the preferred embodiment of the present invention.

As shown in FIG. 1, a system 1 comprises a switched reluctance (SR) motor 10 driving a load 2 of the automobile vehicle or other article/machine, a motor controller 6 electrically connected with the SR motor 10 and an electric storage battery 8, and an electronic control unit 7 of the load 2, in turn electrically connected with the motor controller 6.

Figure 2:
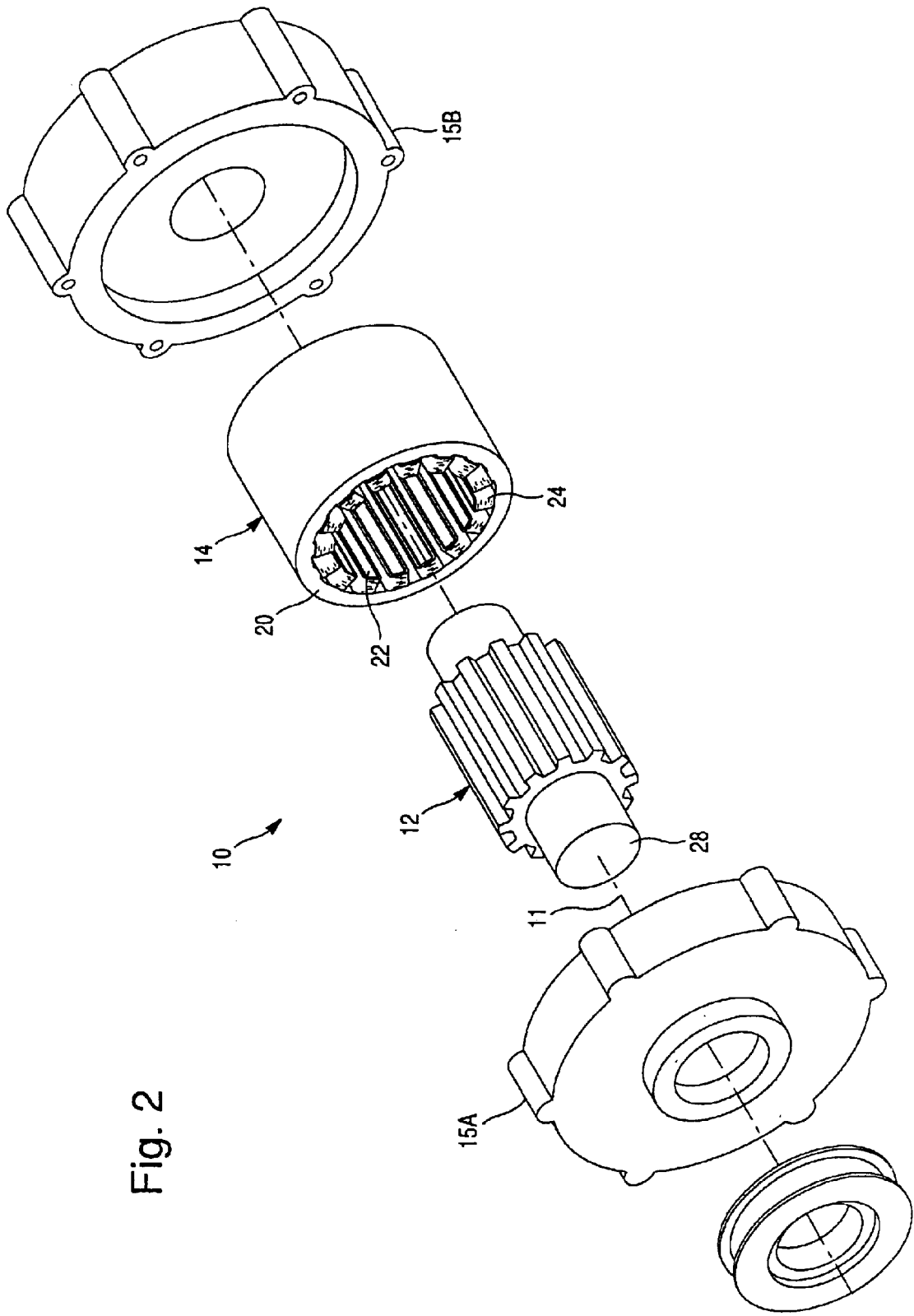
FIG. 2 is an exploded perspective view of a switched reluctance motor in accordance with the preferred embodiment of the present invention.

FIG. 2 of the drawings illustrates in detail the switched reluctance motor of the present invention, indicated generally as 10. The switched reluctance motor 10 includes a rotor 12 rotatably supported within a stator 14, which is generally hollow and cylindrical in shape.

The stator 14 includes a generally hollow and cylindrical in shape body portion 20, a plurality of stator poles 22 radially inwardly extending from the body potion 20 throughout the length thereof, and phase windings in the form of a plurality of electromagnetic phase coils 24 wound about the stator poles 22 (only four coils 24 are illustrated in FIG. 2). The stator poles 22 are preferably provided in opposing pairs. Each of the stator poles 12 may be generally trapezoidal or rectangular in cross sectional shape or have any other appropriate shape. The radially innermost surfaces of the stator poles 22 are slightly curved so as to define an inner diameter.

The phase coils 24 are provided at pre-selected groups of the stator poles 22 to define a respective stator phase. The phase coils 24 may be made from conventional electrically conductive materials such as copper. The coils 24 may be wound around pre-selected ones of the stator poles 22 in a conventional manner to define one machine-operating phase ("single-phase arrangement"), two machine operating phases ("two-phase arrangement"), or more than two machine operating phases, such as four ("multi-phase arrangement").

Figure 3:
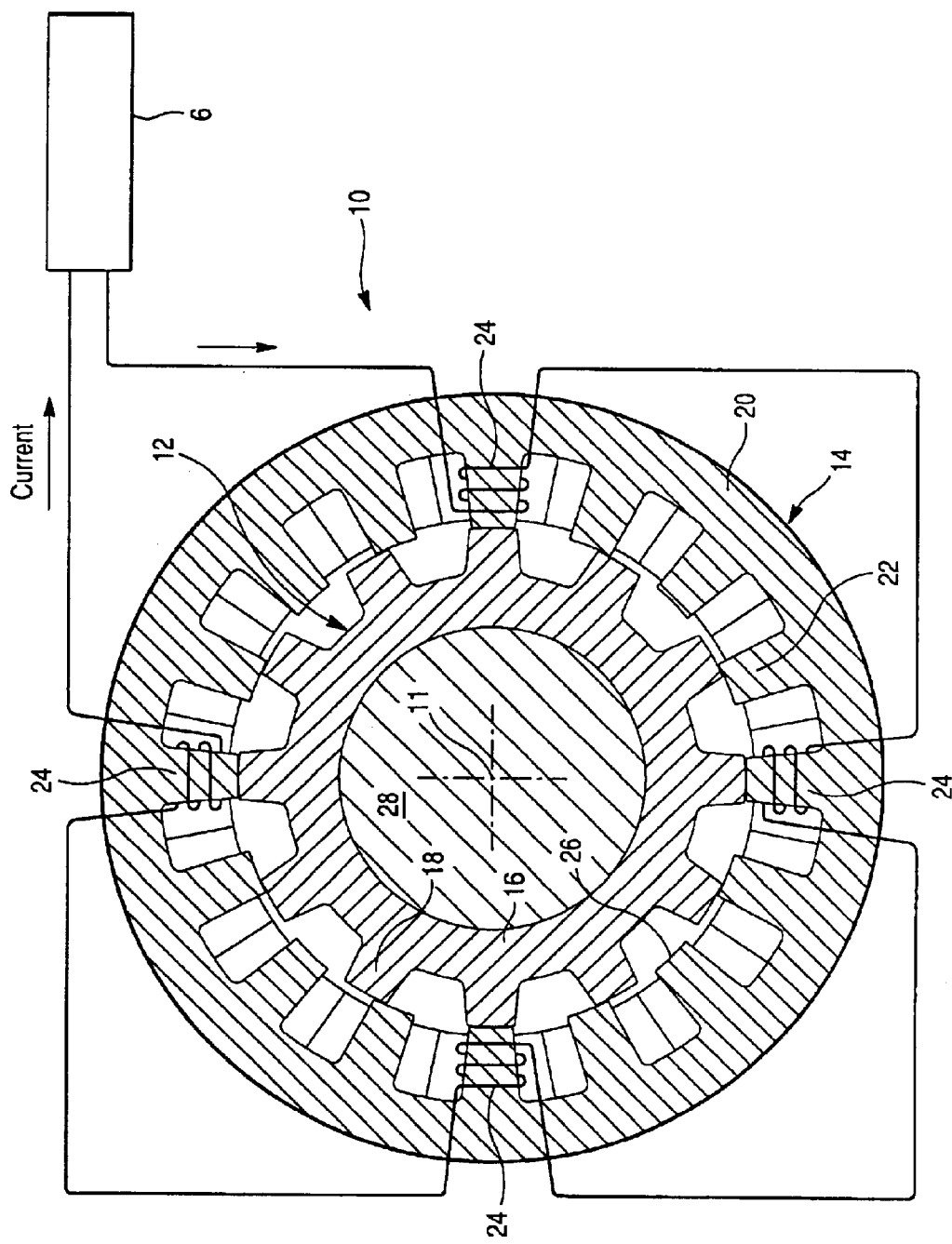
FIG. 3 is a sectional view of the switched reluctance motor in accordance with the preferred embodiment of the present invention.

In the particular exemplary embodiment of the present invention, illustrated in detail in FIG. 3, the stator 14 is provided with eight pairs of diametrically opposing stator poles 22. However, a greater or lesser number of stator poles 22 may be provided. The eight pairs of opposite stator poles 22 are further provided with four phase windings defining four phases of the SR motor 10 (only one phase winding is shown in FIG. 3). Each of these phase windings includes four phase coils 24 connected in series, as illustrated in FIG. 3. Those skilled in the art would appreciate that any even number of the phase coils wound about the stator poles and connected in series or parallel may define a phase of the SR motor, such as two, three, four, or more. Those skilled in the art would also appreciate that the phase coils may be connected in parallel or some combination of series and parallel for beneficial SRM performance as determined by the designer.

The system 1 further includes a circuit for delivering electric current from the phase windings to the electric storage battery 8, provided by the motor controller 6 electrically connected with from the phase windings of the SR motor 10 and the electric storage battery 8.

The body portion 20 of the stator 14 is centered about an axis 11 and has an axially extending central bore 26. The body portion 20 is provided to support the stator poles 22 evenly spaced along an inner peripheral surface thereof, and to maintain them in proper alignment.

As illustrated in FIG. 2, the body portion 20 of the stator 14 is disposed within a housing including a first part 15a and second part 15b interconnected by any appropriate fastening means, such as bolt connection (not shown).

The rotor 12 that is coaxially disposed within the central bore 26 of the stator 14. The rotor 12 is operatively coupled to an output shaft 3 of the engine 2 for rotation therewith. Like the stator 14, the rotor 12 is preferably formed of a plurality of laminations of a magnetically permeable material, such as a conventional ferromagnetic material.

The rotor 12 is substantially cylindrical and is centered about the axis 11. The rotor 12 includes a body portion 16 and a plurality of radially outwardly extending rotor poles 18 integrally formed thereon. As with the stator poles 22, the rotor poles 18 extend longitudinally throughout the length of the rotor 12 and are preferably provided in opposed pairs. The number of rotor poles 14 is different from the number of stator poles 12. The rotor poles 18 provide a predetermined and desired path for the transfer of magnetic flux from the rotor 12 to the stator 14 and vice versa. As best shown in FIG. 3, the rotor poles 18 are evenly spaced along an outer peripheral surface of the body portion 16 of the rotor 12.

Each of the rotor poles 18 may be generally trapezoidal or rectangular in cross sectional shape. The radially outermost surfaces of the rotor poles 18 are slightly curved so as to define an outer diameter. The outer diameter defined by the rotor poles 18 is preferably only slightly smaller than the inner diameter defined by the stator poles 22. Thus, the radial gap defined between the stator poles 22 and the rotor poles 18 when they are aligned is relatively small. The rotor 12 is mounted about a rotor shaft 28 and drivingly secured thereto by any appropriate means well known in the art, such as spline connection.

In the preferred exemplary embodiment illustrated in detail in FIG. 3, the stator 12 includes six pairs of the rotor poles 18. However, a greater or lesser number of rotor poles 18 may by provided. The number of rotor poles 18 is different from the number of stator poles 22.

While the embodiment of FIGS. 2 and 3 shows a centrally-located rotor 12 with the stator 14 disposed on the outside of the rotor 12, the rotor 12 may be alternately disposed outside of the stator 14.

Referring now back to FIG. 1, a shaft 3 of the load 2 is provided with a drive pulley 4a. Similarly, the rotor shaft 28 is provided with a driven pulley 4b. An endless element 5 is provided to transmit a drive torque from the drive pulley 4a to the driven pulley 4b. Preferably, the endless element 5 is a V-belt. It will be appreciated that any other types of the endless torque-transmitting elements known in the prior art, such as a toothed belt, flat belt, chain, etc., may be employed.

This invention presents a new approach to the automatic control of the turn-on angle used to excite the switched-reluctance motor (SRM). The control algorithm of this invention determines the turn-on angle that supports the most efficient operation of the motor drive system, and consists of two pieces. In the first piece, the control technique monitors the position of the first peak of the phase current ($\theta_p$) and seeks to align this position with the angle where the inductance begins to increase ($\theta_m$). In the second piece, the controller monitors the peak phase current and advances the turn-on angle if the commanded reference current cannot be produced by the controller. The first piece of the controller tends to be active below base speed of the SRM, where phase currents can be built easily by the inverter and $\theta_p$ is relatively independent of $\theta_m$. The second piece of the controller tends to be active above base speed, where the peak of the phase currents tends to naturally occur at $\theta_m$, regardless of the current amplitude. The two pieces of the controller naturally exchange responsibility as a result of a change in command or operating point.

Figure 4:
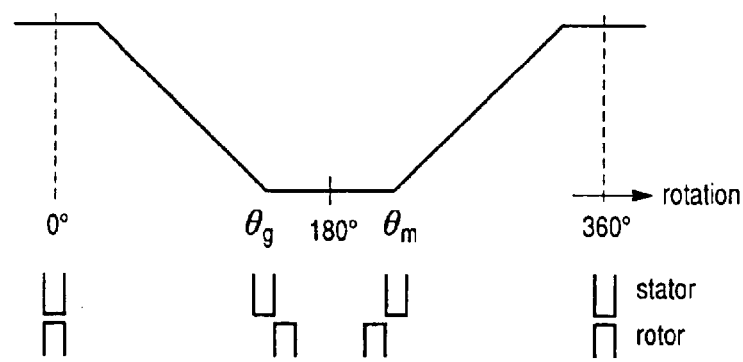
FIG. 4 is a linear inductance profile of the SRM showing $\theta_g$ and $\theta_m$.

The objectives of the algorithm are best explained through consideration of the linear inductance profile for the SRM shown in FIG. 4. The minimum inductance region is defined by the angular interval over which the rotor poles do not overlap the stator poles. The maximum inductance region is defined by the angular interval over which there is complete overlap between the stator and rotor poles. The regions of increasing and decreasing inductance correspond to varying overlap between the stator and rotor poles.

For operation as a motor, the SRM phase currents must be present in the phase winding as the inductance is increasing in the direction of rotation. For operation as a generator, the SRM phase currents must be present in the phase winding as the inductance is decreasing in the direction of rotation. The polarity of current is immaterial, so we assume that the phase currents are always positive.

If one were to examine the static torque curve for a typical SRM, it would be observed that the maximum torque for a given amount of current occurs as the rotor begins to move out of the minimum inductance position. This observation suggests that maximum torque per Ampere is produced upon leaving the minimum inductance position. Iron permeance causes torque production to fall off as overlap between the stator and rotor poles increases. In applications where average torque is of primary importance, it is important to make the most of the region near the unaligned position. Because it takes time to build the phase currents, the invention anticipates the arrival of the torque production region. The invention, therefore, turns on the phase windings before the angle marked $\theta_m$ in FIG. 4 so that the current is at $I_{ref}$ when the rotor reaches $\theta_m$.

Figure 5:
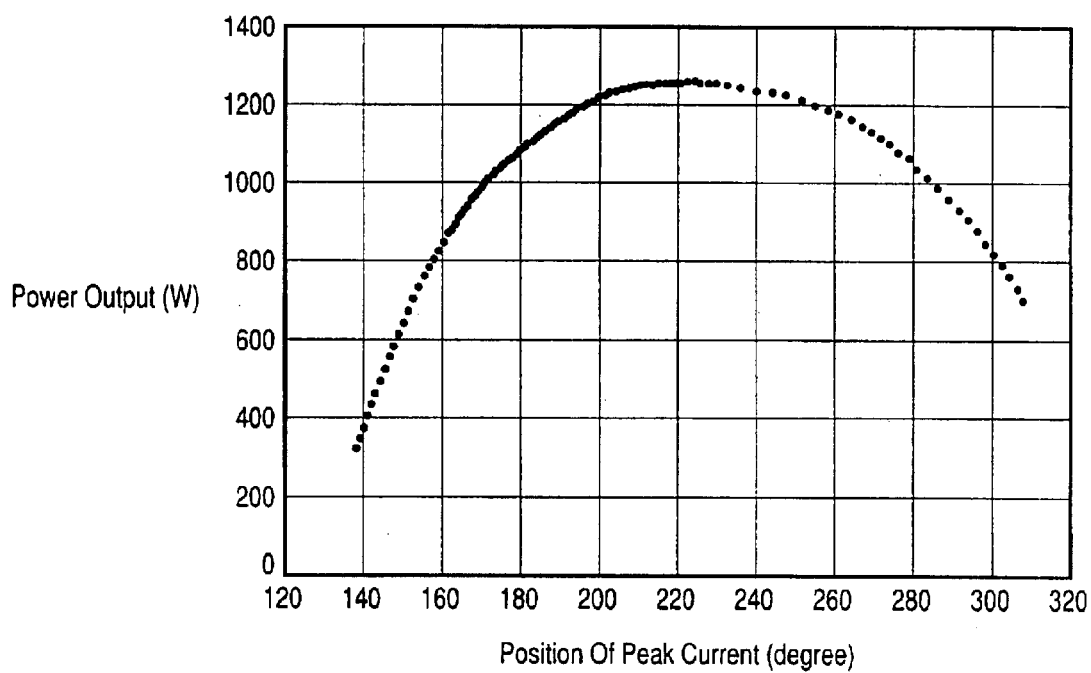
FIG. 5 is a graph of power output versus angular position of the peak current to graphically illustrate the SRM power output as a function of the location where the current first reaches $I_{ref}$.

As explained below, an experimental SRM drive has been modeled drive to support simulation studies. The SRM magnetics have been modeled through finite element analysis to capture the relevant spatial and magnetic nonlinearities that must be considered for meaningful control design. For a given speed, $I_{ref}$ and conduction angle $\theta_{cond}=\theta_{off}-\theta_{on}$, FIG. 5 shows the motor power output versus the place where the peak current occurs. For the SRM under consideration, $\theta_m=225°$ and $\theta_g=135°$ (electrical). As shown in FIG. 5, maximum power is produced when the first peak current occurs at $\theta_m$.

The conventional approach to determining $\theta_{on}$ is to work backward from $\theta_m$:

$$\theta_{on}=\theta_m-(L_{min}I_{ref}\omega))/V_{dc} \qquad \text{(Equation 1)}$$

where $L_{min}$ is the minimum inductance, $V_{dc}$ is the dc bus voltage, $\omega$ is the rotor speed, and $I_{ref}$ is the reference current level.

Equation 1 above assumes the inductance is constant during the region [$\theta_g,\theta_m$]. The inductance can be a function of the phase current, rotor position and temperature. At low speed this method can give reasonable performance. For operation over a wide speed range Equation 1 starts to break down as $\theta_{on}$ must be made to occur before $\theta_g$ due to the increased back emf voltage. It is desired to have closed loop control that provides the turn-on angle making first peak of the phase current at $\theta_m$, without the need of accurate (nonlinear) motor parameters and measurement of the dc bus voltage.

The proposed closed loop control algorithm continuously monitors the position of the first peak of the phase current ($\theta_p$). The turn-on is advanced or retarded automatically according to the error between $\theta_p$ and $\theta_m$. This aspect of the controller successfully places $\theta_p$ at $\theta_m$. Above base speed, the peak current naturally tends to occur near $\theta_m$. At these speeds $\theta_{on}$ has little impact on $\theta_p$ but significant impact on the magnitude of the current at $\theta_p$. This phenomenon can be observed from FIG. 7, where the SRM is simulated at 2500 rpm with three different turn-on angles. For each of the turn-on angles $\theta_p$ occurs approximately at the same place with different current magnitudes. To reflect this, the algorithm forces the peak phase current to match the commanded phase current. Feed-forward control of $\theta_{on}$ using Equation 1 is used to speed convergence to the correct value of $\theta_{on}$. The control of $\theta_{on}$ is summarized in the algorithm shown in FIG. 6.

If the controller is in current regulation mode $I_p$ occurs close to $I_{ref}$ so the error between $I_p$ and $I_{ref}$ has little effect on the command for $\theta_{on}$. Below base speed, the piece of the controller responsible for keeping the $\theta_p$ at $\theta_m$ effectively works to achieve the control objective. At high speed if the controller is in voltage control mode $\theta_p$ naturally occurs at $\theta_m$. The piece of the controller responsible for forcing $I_p$ to track $I_{ref}$ effectively works to advance the turn on angle to keep $I_p$ close to $I_{ref}$. If the reference current or the motor speed is reduced, the drive enters into current regulation mode and $\theta_p$ occurs before $\theta_m$. The piece of the controller responsible for forcing $\theta_p=\theta_m$ becomes active and brings $\theta_p$ to $\theta_m$ by retarding $\theta_{on}$.

The algorithm discussed above and schematically shown in FIG. 6 was implemented in simulation to confirm proper operation before being experimentally implemented on the physical system. The SRM to which the simulation is applied is a 12/8 three-phase SRM designed for a 1 kW 42 V automotive application. The SRM magnetics are modeled analytically based on data collected through known finite element analysis techniques.

FIG. 8 shows the operation of the automatic controller for $\theta_{on}$ for operation of the SRM at 1000 rpm with a commanded peak phase current of 70 A. The controller drives changes in $\theta_{on}$ in order to force $\theta_p=\theta_m$ and $I_p=I_{ref}$. At this speed, the drive is able to produce the reference current easily and $I_p$ is naturally close to $I_{ref}$ without any control effort. $\theta_{on}$ is heavily adjusted by the piece of the control that tries to force $\theta_p=\theta_m$. As shown, the motor torque production in FIG. 8 average torque production increases as $\theta_p$ approaches to the $\theta_m$. The conduction angle $\theta_{cond}$ is maintained at 145° (electrical) for all operating conditions. FIG. 9 shows the adjustment of the turn on angle at 2500 rpm. $\theta_p$ is close to the $\theta_m$ throughout the operation. The controller objective of keeping $\theta_p$ close to $\theta_m$ is naturally achieved. The other objective to produce the desired $I_{ref}$ is achieved through the control.

Figure 6:
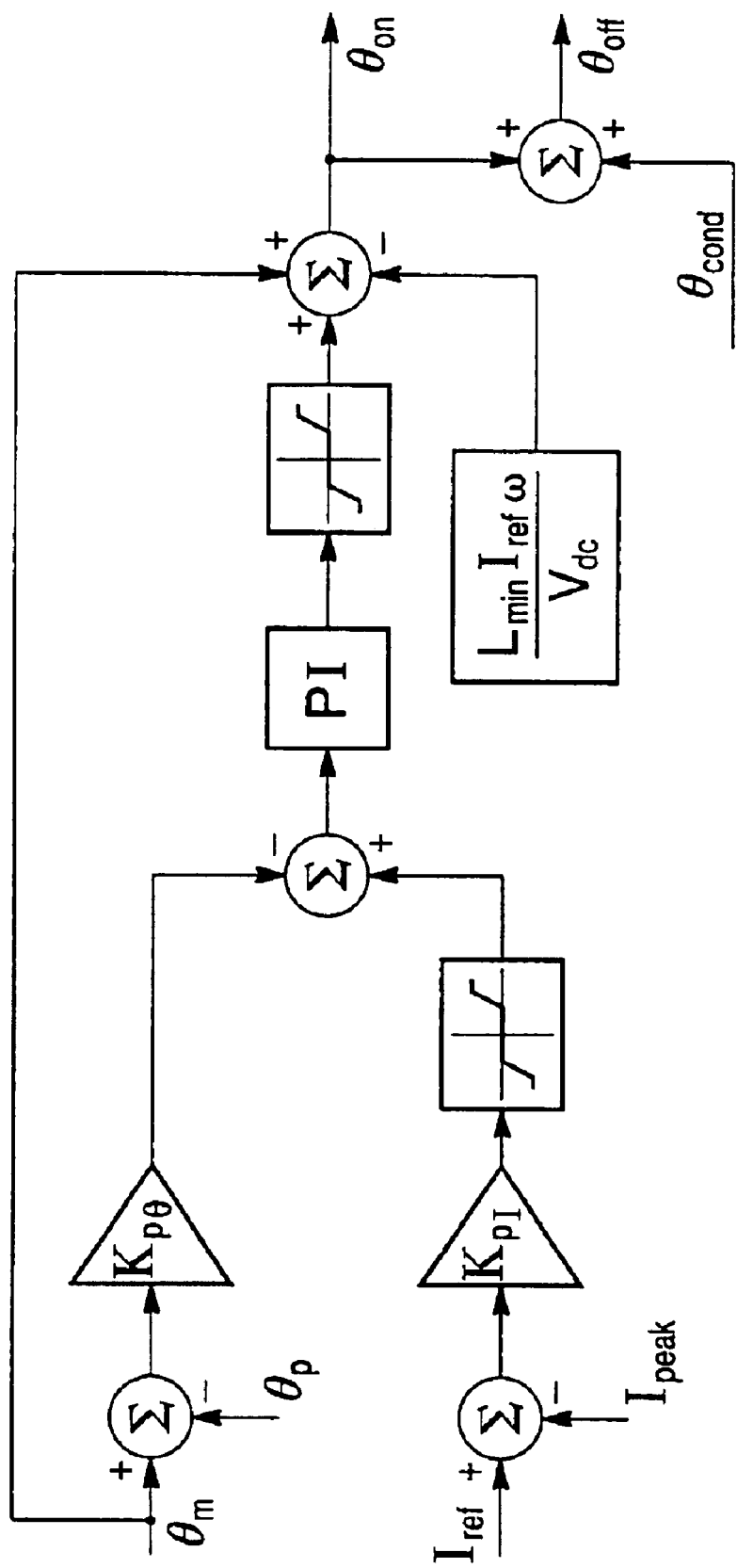
FIG. 6 is a schematic representation of the algorithm according to the instant invention to automatically adjust the turn-on angle.
Figure 7A:
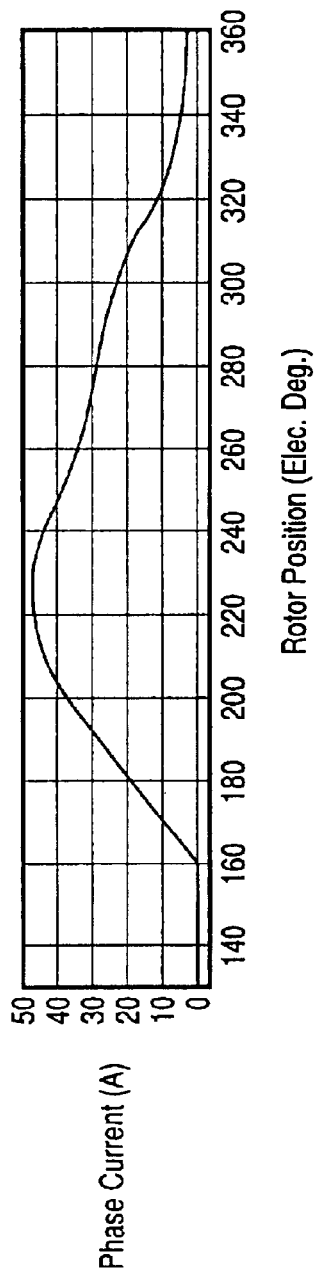
FIGS. 7a–7c are graphs showing phase current versus angular rotor position at 2500 rpm with different turn-on angles.
Figure 7B:
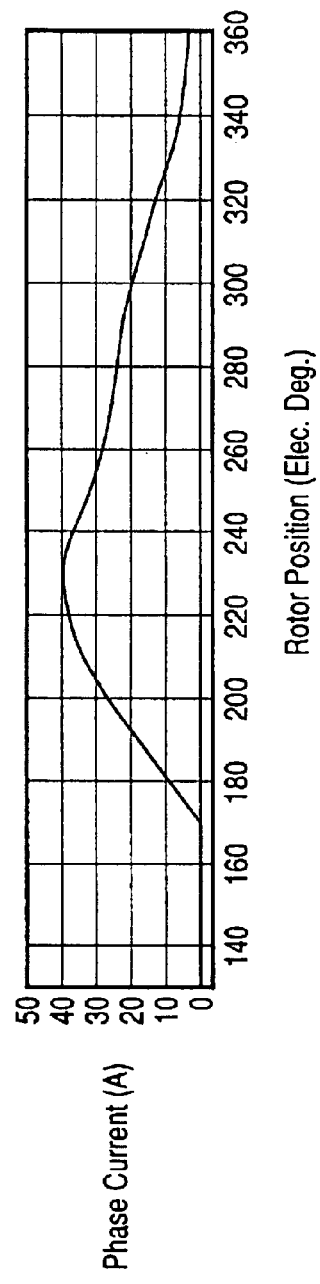
Figure 7C:
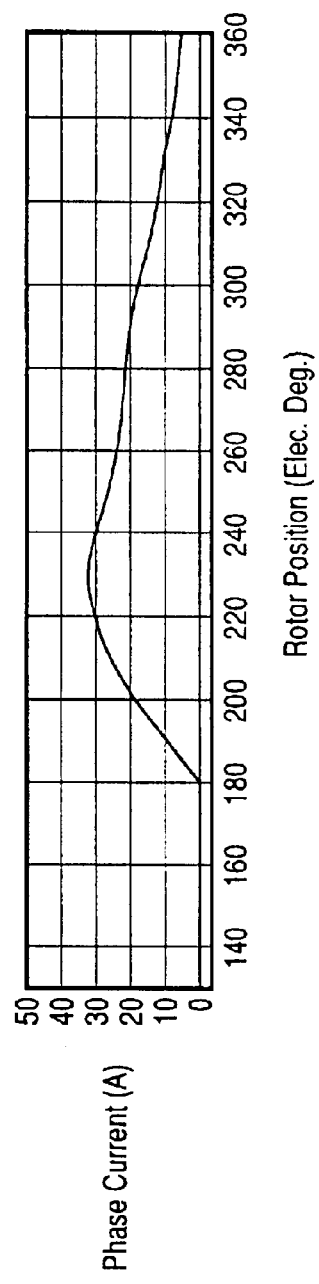
Figure 8A:
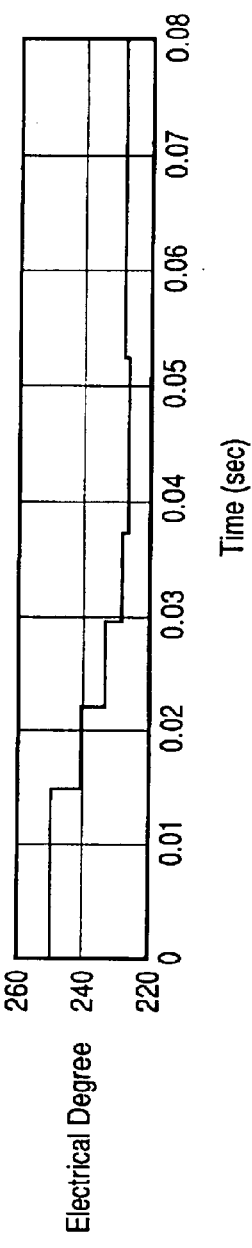
FIG. 8a is a graph showing electric angular rotor position versus time to show the position of peak phase current in relation to FIGS. 9b–9d giving the automatic adjustment of $\theta_{on}$ used to drive $\theta_p$ to $\theta_m$ at 1000 rpm for a 70A reference current.
Figure 8B:
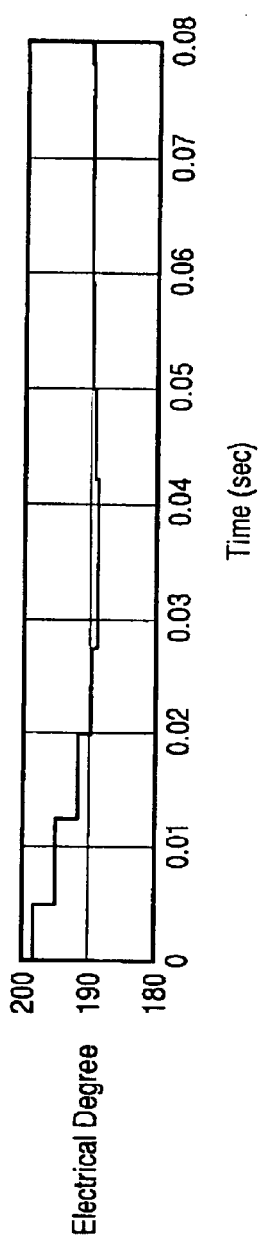
FIG. 8b is a graph showing electrical angular rotor position versus time to show turn-on angle in relation to FIGS. 8a, 8c and 8d giving the automatic adjustment of $\theta_{on}$ used to drive $\theta_p$ to $\theta_m$ at 1000 rpm for a 70A reference current.
Figure 8C:
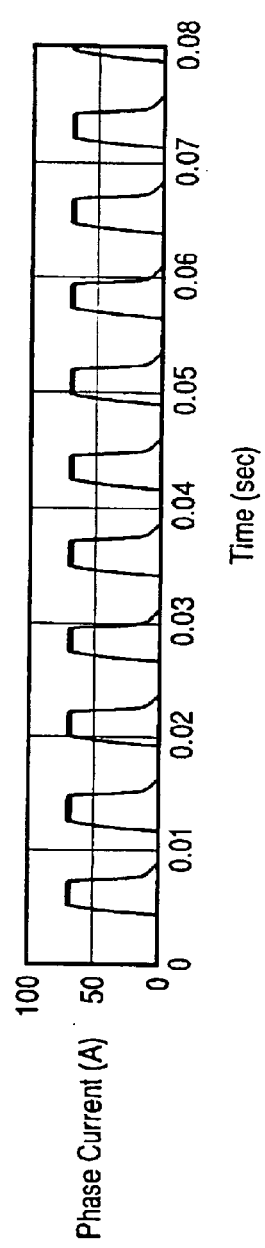
FIG. 8c is a graph showing phase current versus time to show motor phase current in relation to FIGS. 8a, 8b and 8d giving the automatic adjustment of $\theta_{on}$ used to drive $\theta_p$ to $\theta_m$ at 1000 rpm for a 70A reference current.
Figure 8D:
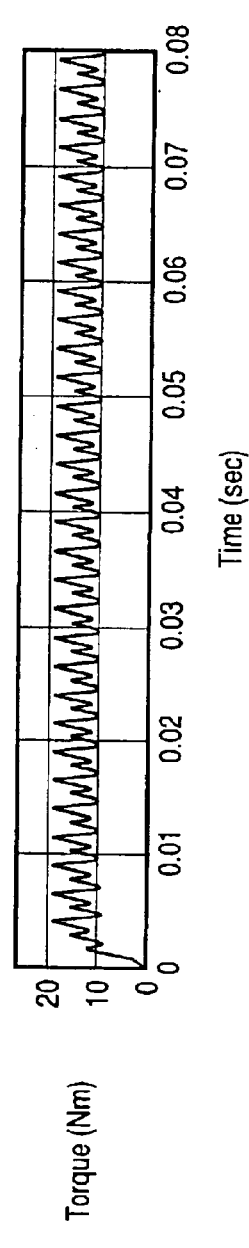
FIG. 8d is a graph showing motor torque versus time to show motor torque in relation to FIGS. 8a–8c giving the automatic adjustment of $\theta_{on}$ used to drive $\theta_p$ to $\theta_m$ at 1000 rpm for a 70A reference current.
Figure 9A:
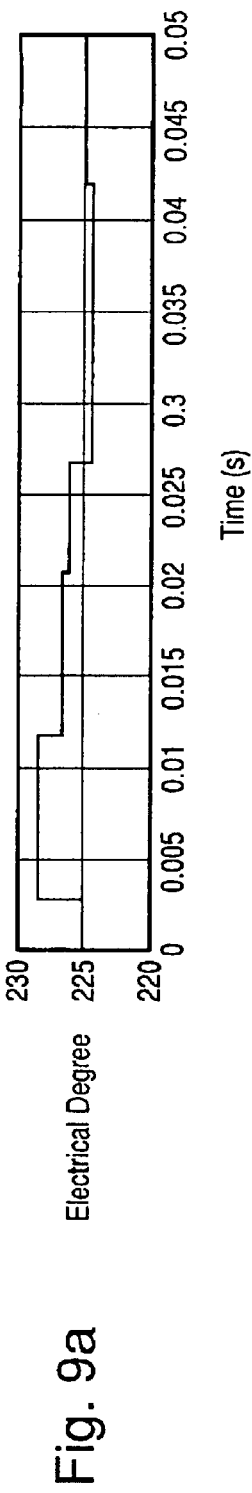
FIG. 9a is a graph showing electric angular rotor position versus time to show the position of peak phase current in relation to FIGS. 9b–9d giving the automatic adjustment of $\theta_{on}$ used to drive $\theta_p$ to $\theta_m$ at 2500 rpm for a 50A reference current.
Figure 9B:
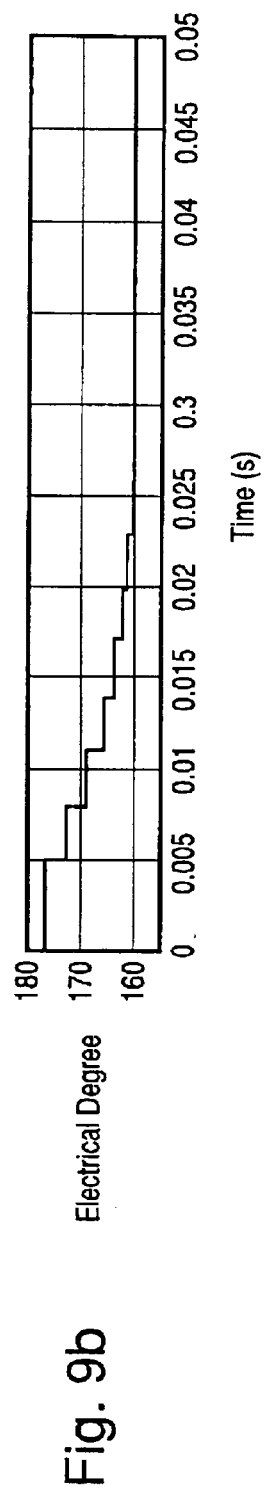
FIG. 9b is a graph showing electrical angular rotor position versus time to show turn-on angle in relation to FIGS. 9a, 9c and 9d giving the automatic adjustment of $\theta_{on}$ used to drive $\theta_p$ to $\theta_m$ at 2500 rpm for a 50A reference current.
Figure 9C:
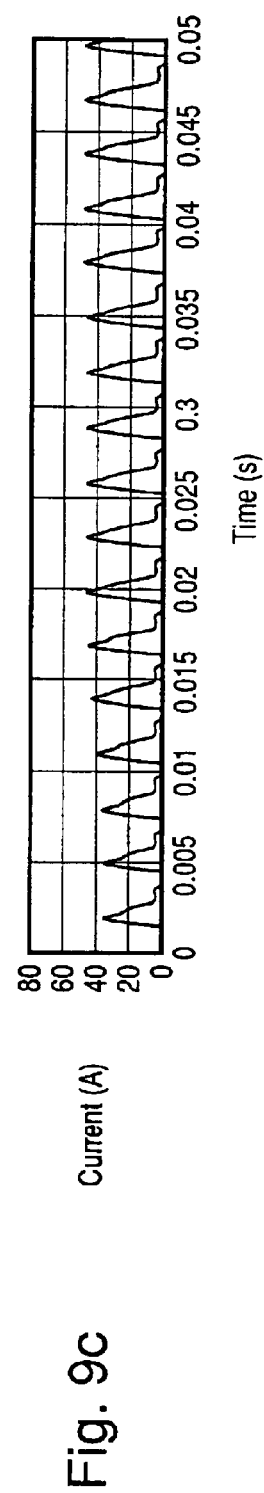
FIG. 9c is a graph showing phase current versus time to show motor phase current in relation to FIGS. 9a, 9b and 9d giving the automatic adjustment of $\theta_{on}$ used to drive $\theta_p$ to $\theta_m$ at 2500 rpm for a 50A reference current.
Figure 9D:
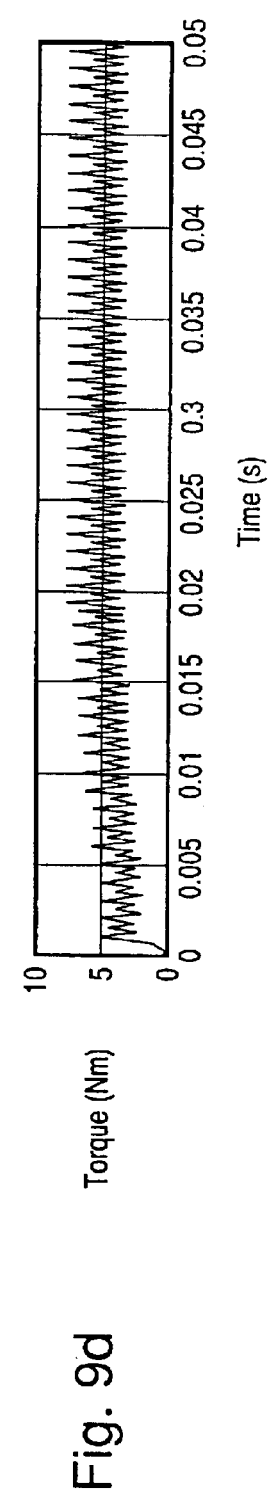
FIG. 9d is a graph showing motor torque versus time to show motor torque in relation to FIGS. 9a–9c giving the automatic adjustment of $\theta_{on}$ used to drive $\theta_p$ to $\theta_m$ at 2500 rpm for a 50A reference current.

FIG. 6 shows the transient performance of the controller at 2500 rpm. The reference current is reduced from 50 A to 30 A at 0.5 s. The piece of the control responsible for forcing $I_p=I_{ref}$ is incapable of sufficiently reducing the advance angle, so the current regulator becomes active. Excessive advance angle does not cause $I_p$ to be greater than $I_{ref}$ because the current regulator prevents the phase current from being greater than $I_{ref}$. But because $\theta_p$ occurs earlier than $\theta_m$, the piece of the controller that is responsible for forcing $\theta_p=\theta_m$ provides effort to reduce the advance angle to the correct value.

Figure 11:
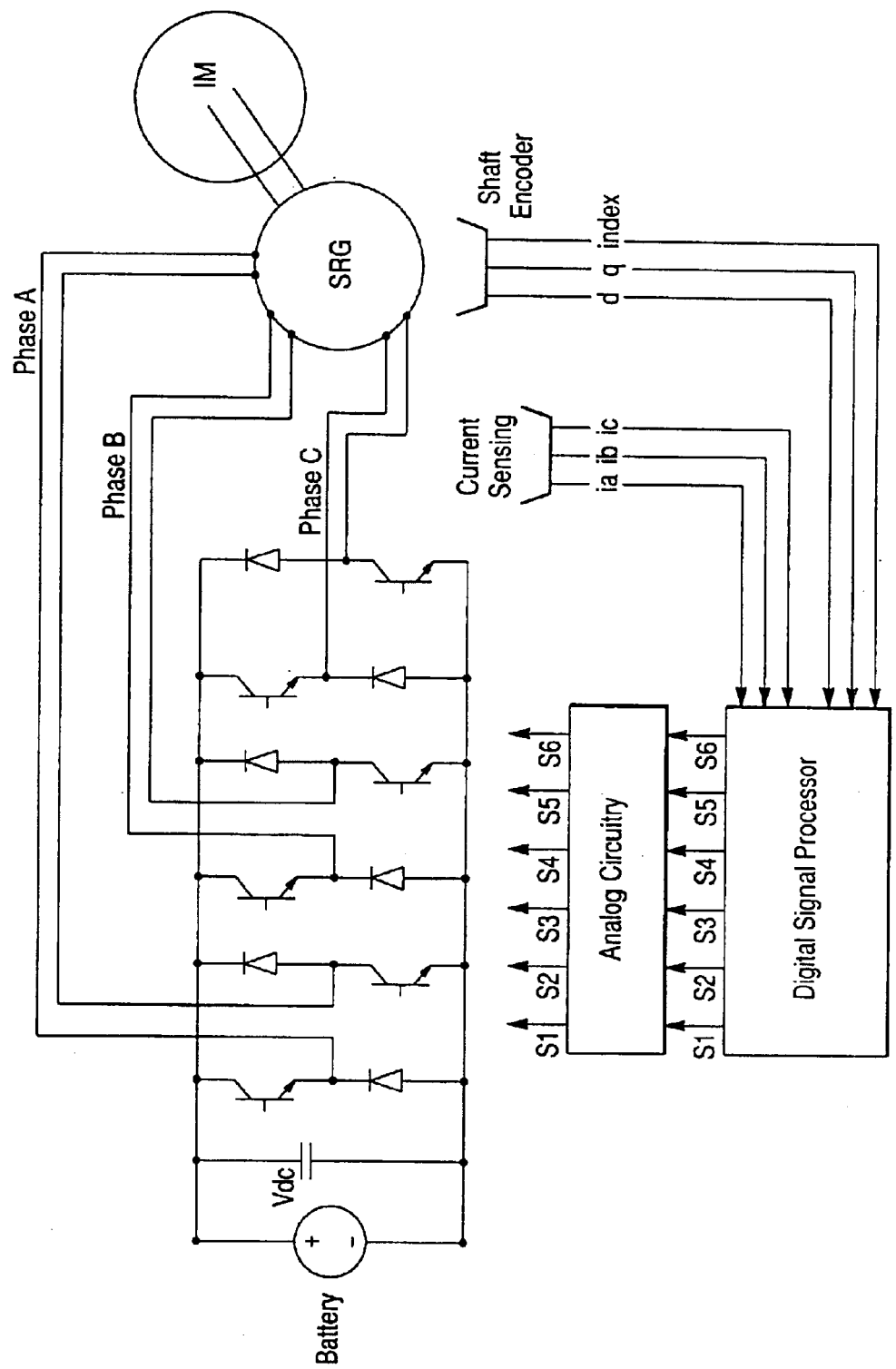
FIG. 11 is a schematic showing the block diagram of the experimental setup used to generate the test results shown in FIGS. 12–14.

The performance of the controller has been experimentally verified with a 12/8 three-phase SRM designed for a 1 kW 42V automotive application. The control algorithm discussed above was implemented using an Analog Devices ADMC401 digital signal processor. The SRM was coupled to an induction motor, which acts as a constant speed mechanical load through an adjustable speed drive. A shaft encoder provides direct, quadrature and index pulses to the quadrature encoder pulse unit of the DSP. A 42V battery is used throughout the tests to provide dc power to the inverter. FIG. 11 shows a block diagram of the experimental setup for the tests.

Figure 12A:
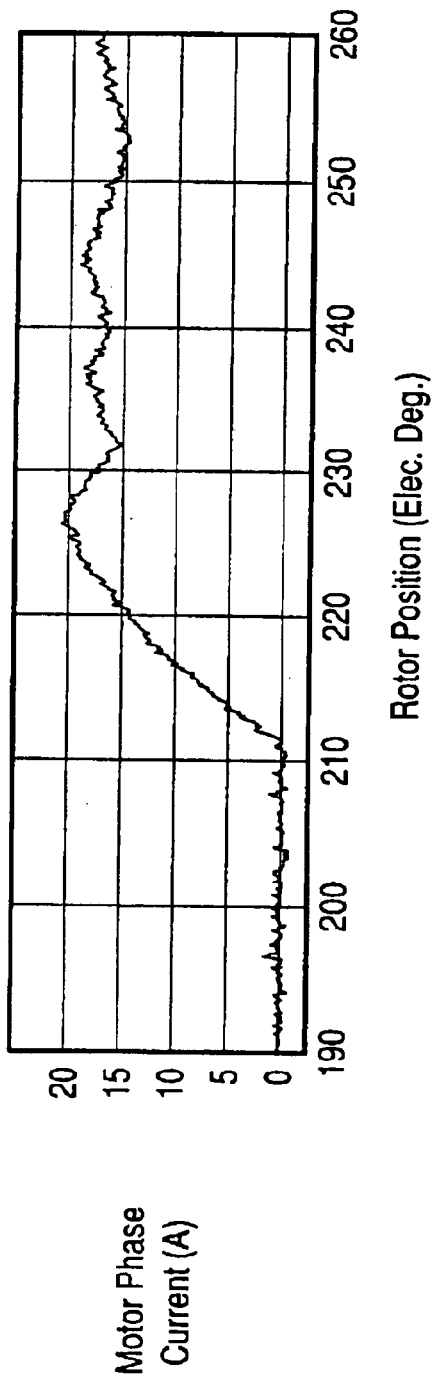
FIG. 12a is a graph of motor phase current versus rotor position showing the performance of the system of this invention with a closed loop controller at 1000 rpm for a 20A reference current.
Figure 12B:
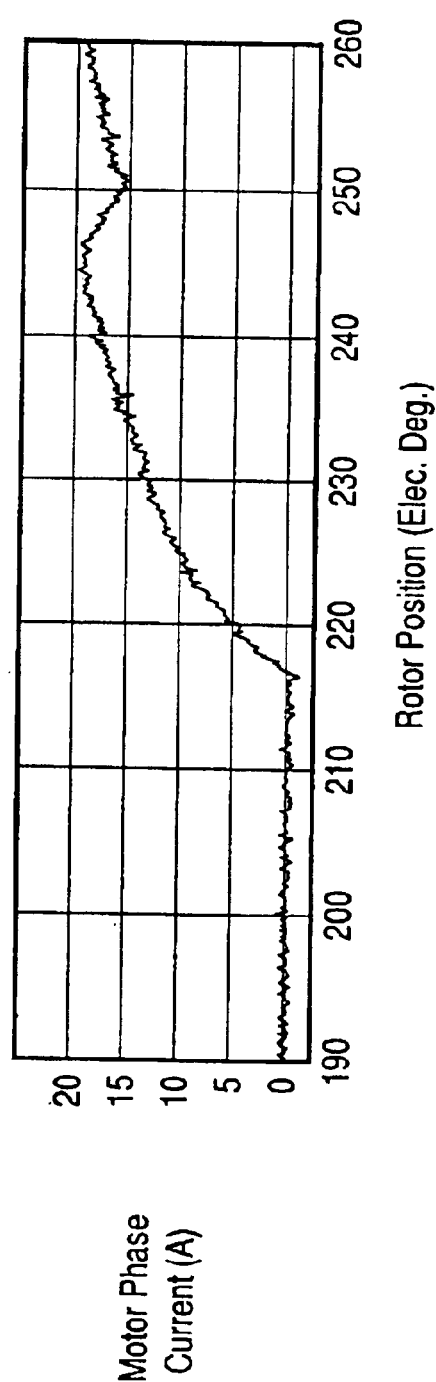
FIG. 12b is a graph of motor phase current versus rotor position showing the performance of the system of this invention without a closed loop controller at 1000 rpm for a 20A reference current.
Figure 13A:
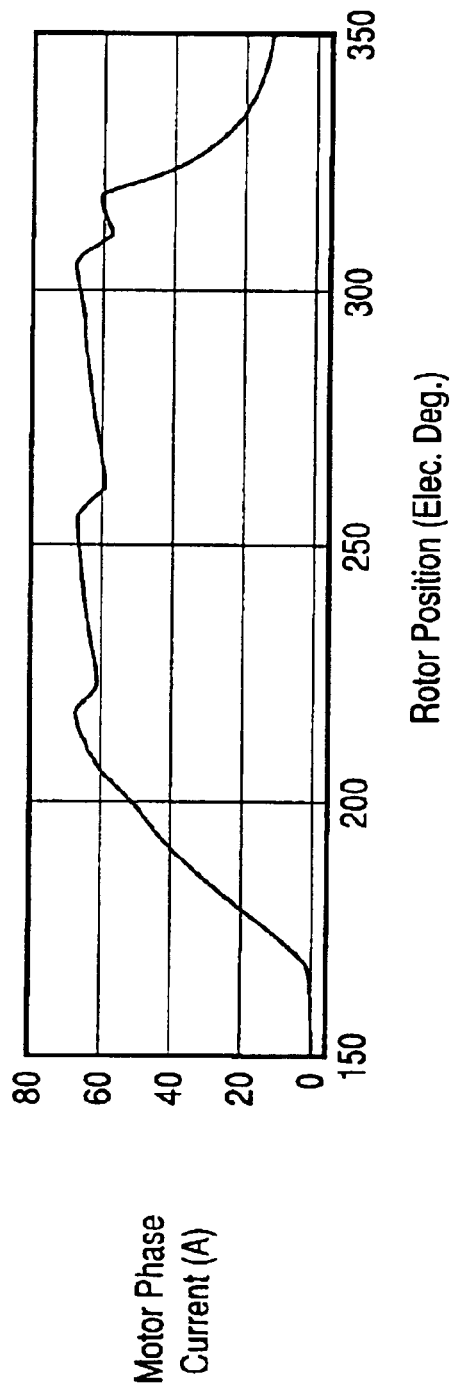
FIG. 13a is a graph of motor phase current versus rotor position showing the performance of the system of this invention with a closed loop controller at 1000 rpm for a 70A reference current.
Figure 13B:
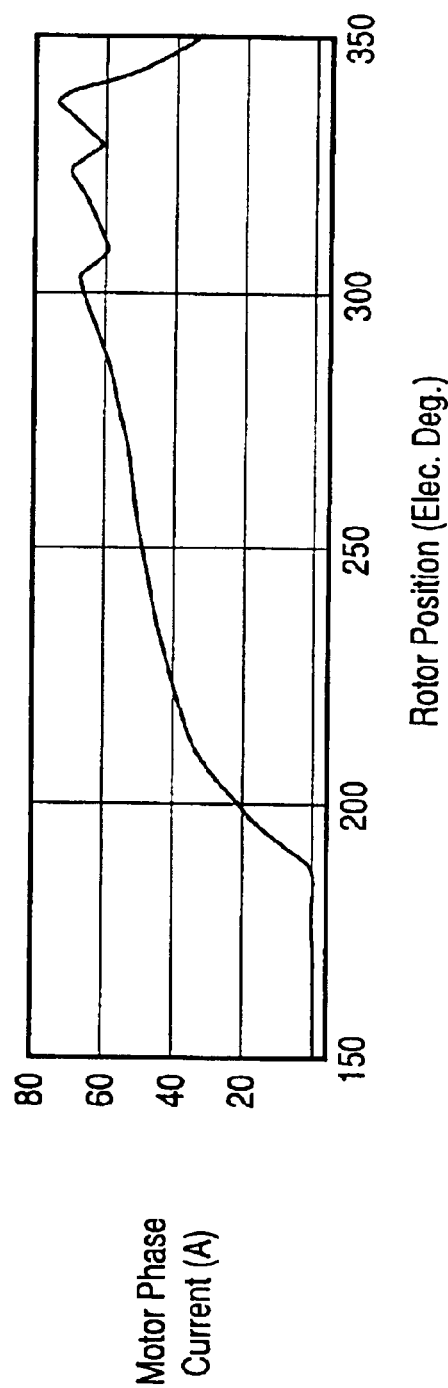
FIG. 13b is a graph of motor phase current versus rotor position showing the performance of the system of this invention without a closed loop controller at 1000 rpm for a 70A reference current.
Figure 14A:
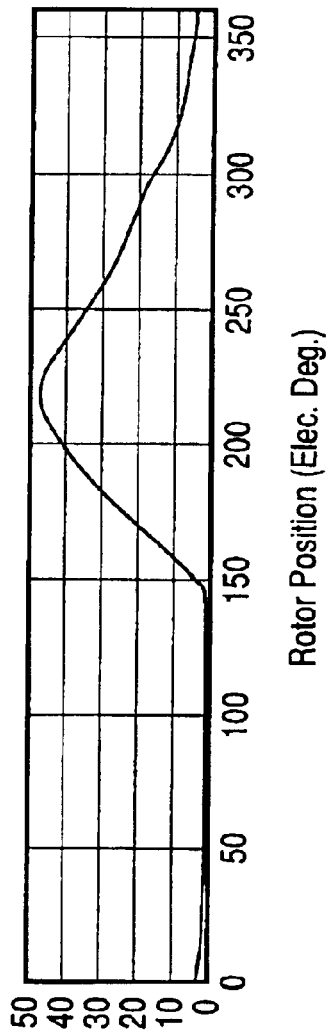
FIG. 14a is a graph of motor phase current versus rotor position showing the performance of the system of this invention with a closed loop controller at 2500 rpm for a 30A reference current.
Figure 14B:
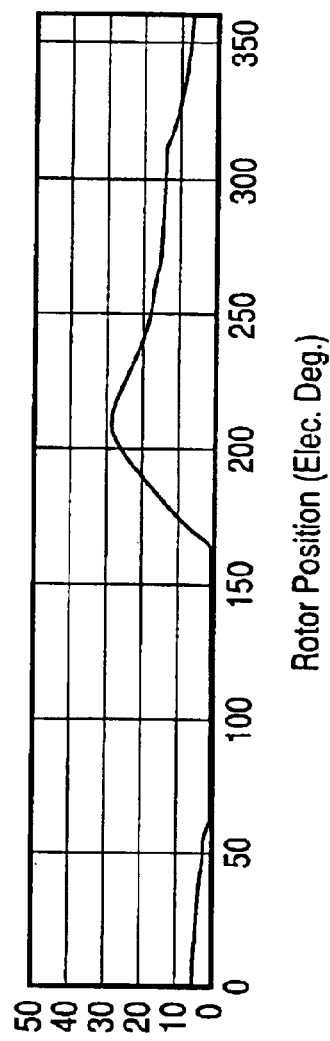
FIG. 14b is a graph of motor phase current versus rotor position showing the performance of the system of this invention with a closed loop controller at 2500 rpm for a 50A reference current.
Figure 14C:
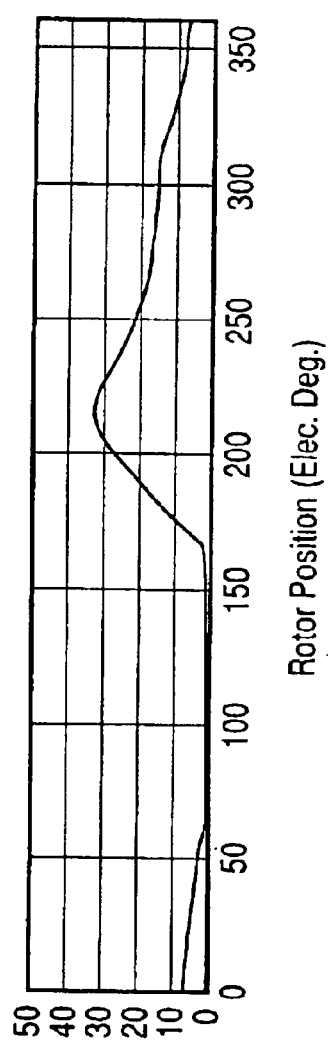
FIG. 14c is a graph of motor phase current versus rotor position showing the performance of the system of this invention without a closed loop controller at 2500 rpm for a 50A reference current.

Experimental tests were performed at a variety of operating points to show the effectiveness of the controller. FIGS. 12a and 12b show the drive performance at 1000 rpm for a 20 A reference current with and without the closed loop angle controller. The analytically calculated advance angle does not find the advance angle accurately to make the $\theta_p=\theta_m$. The closed loop angle controller on the other hand produces the necessary advance angle to make $\theta_p=\theta_m$. FIGS. 13a and 13b show a similar test for a 70 A reference current. Again performance of the drive is much better with the closed loop angle controller.

Figure 10A:
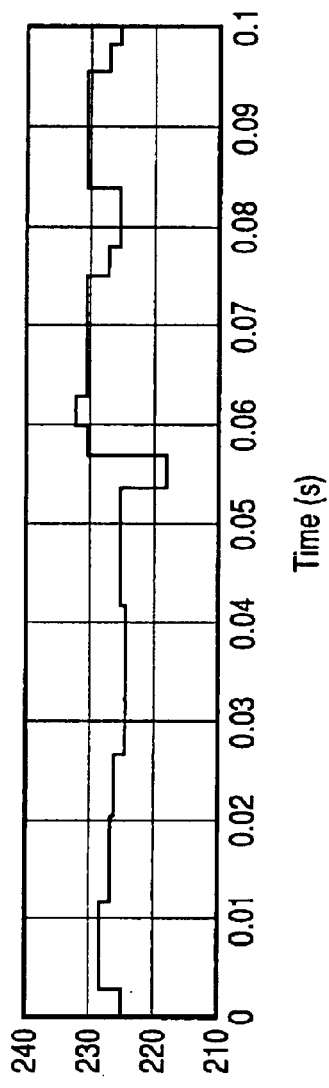
FIG. 10a is a graph showing electric angular rotor position versus time to show the position of peak phase current in relation to FIGS. 10b–10c giving the automatic adjustment of $\theta_{on}$ used to drive $\theta_p$ to $\theta_m$ at 2500 rpm when the reference current is reduced from 50A to 30A at 0.5 s.
Figure 10B:
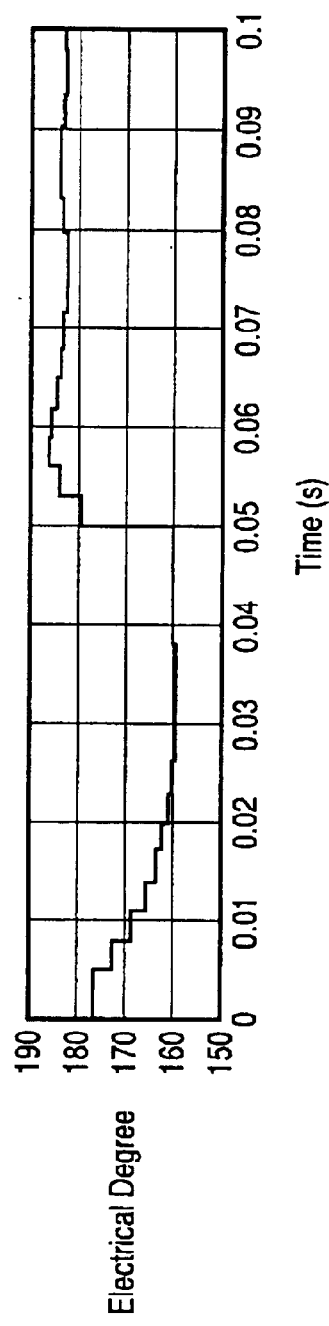
FIG. 10b is a graph showing electrical angular rotor position versus time to show turn-on angle in relation to FIGS. 10a and 10c giving the automatic adjustment of $\theta_{on}$ used to drive $\theta_p$ to $\theta_m$ at 2500 rpm when the reference current is reduced from 50A to 30A at 0.5 s.
Figure 10C:
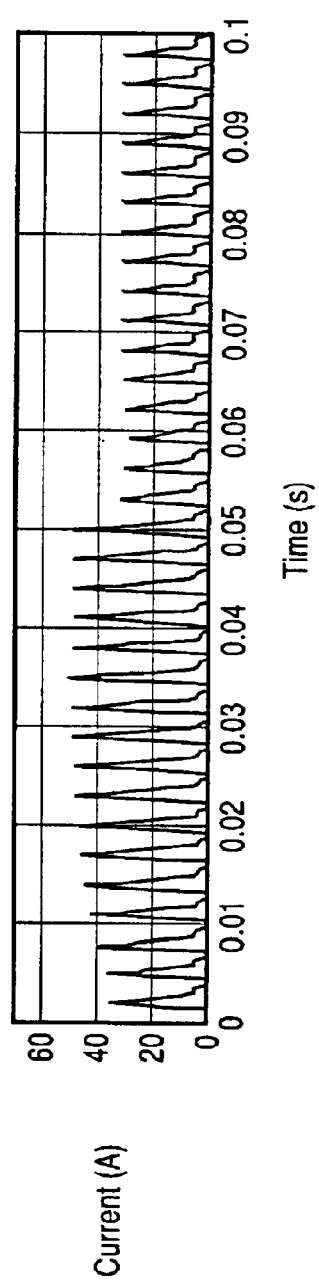
FIG. 10c is a graph showing phase current versus time to show motor phase current in relation to FIGS. 10a and 10b giving the automatic adjustment of $\theta_{on}$ used to drive $\theta_p$ to $\theta_m$ at 2500 rpm when the reference current is reduced from 50A to 30A at 0.5 s.

FIGS. 10a–10c show the effectiveness of the controller at high speed. The closed loop controller effectively works to make both $\theta_p=\theta_m$ and $I_p=I_{ref}$ at reference currents of 30 A and 50 A. FIG. 10c shows the drive response without closed loop control. The drive without the closed loop control only produces 30 A in response to the reference of 50 A. It is worth noting that peak currents are occurring around the same rotor position irrespective of the turn on angle and peak current level.

From the foregoing discussion, it is clear that the present invention provides a new algorithm for the automatic control of on. The inventive approach provides for automatic turn-on angle adjustment without the need for motor parameters or self-tuning techniques. The algorithm monitors the peak phase current and where the peak current occurs, and places the position of the first peak of phase current at $\theta_m$ in order to maximize the torque per Ampere produced by the SRM. The controller also ensures that the peak phase current is equal to the reference current. The motor, inverter and control system are modelled in Simulink to demonstrate the operation of the system. The control technique was then applied to an experimental system. Both simulation and experimental results show that the new control technique provides efficient motor operation with easy implementation and without the need for motor parameters and load conditions.

While the foregoing invention has been shown and described with reference to a preferred system and method, it will be understood by those of skill in the art that various changes in form and detail may be made therein without departing from the spirit and scope of the instant invention.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A method of automatic excitation angle control that supports efficient operation of a switch reluctance motor over an entire speed region to improve performance and efficiency, said method comprising the steps of:

providing the switched reluctance motor;

providing a controller for the switched reluctance motor;

a first monitoring step of continuously monitoring a first turn-on angular position ($\theta_p$) indicative of a first peak of a phase current;

aligning said first turn-on angular position ($\theta_p$) with a second turn-on angular position ($\theta_m$) indicative of where the inductance begins to increase;

a second monitoring step of monitoring said first peak of said phase current; and advancing or retarding a detected turn-on angle to said desired turn-on angle ($\theta_{on}$) when a commanded reference current ($I_{ref}$) cannot be produced by the controller;

wherein said controller determines a desired turn-on angle ($\theta_{on}$) that supports the most efficient operation of a drive system for the switched reluctance motor.

2. The method of claim 1, wherein said first monitoring step and said aligning step are active below a base speed of the switched reluctance motor, where phase currents can be built by an inverter and said first turn-on angular position ($\theta_p$) is relatively independent of said second turn-on angular position ($\theta_m$).

3. The method of claim 2, wherein said second monitoring step and said advancing or retarding step are active above said base speed, where said first peak of said phase current occurs at said second turn-on angular position ($\theta_m$), regardless of current amplitude.

4. The method of claim 3, further comprising the step of forcing said first peak of said phase current to match a commanded phase current.

5. The method of claim 1, wherein the desired turn-on angle is advanced or retarded automatically according to an error between said first turn-on angular position ($\theta_p$) and said second turn-on angular position ($\theta_m$).

6. The method of claim 1, further comprising the step of feed-forward control of said detected turn-an angle to speed convergence to the desired turn-on angle ($\theta_{on}$).

7. The method of claim 1, further comprising the steps of:
   a third monitoring step of continuously monitoring a first turn-on current ($I_p$) indicative of said first peak of said phase current;
   aligning said first turn-on current ($I_p$) with said commanded reference current ($I_{ref}$) indicative of where the inductance begins to increase.

8. The method of claim 7, wherein said controller enters a current regulation mode if at least one of said reference current ($I_{ref}$) and a motor speed is reduced and said first turn-on angular position ($\theta_p$) occurs before said second turn-on angular position ($\theta_m$).

9. A controller for controlling an automatic excitation angle of a switch reluctance motor over an entire speed region to improve performance and efficiency, said controller comprising:
   a first monitoring part that continuously monitors a first turn-on angular position ($\theta_p$) indicative of a first peak of a phase current and aligns said first turn-on angular position ($\theta_p$) with a second turn-on angular position ($\theta_m$) indicative of where the inductance begins to increase; and
   a second monitoring part that monitors said first peak of said phase current and advances or retards a detected turn-on angle to said desired turn-on angle ($\theta_{on}$) when a commanded reference current ($I_{ref}$) cannot be produced by the controller;
   wherein said controller determines a desired turn-on angle ($\theta_{on}$) that supports the most efficient operation of a drive system for the switched reluctance motor.

10. The controller of claim 9, wherein said first monitoring part is active below a base speed of the switched reluctance motor, where phase currents can be built by an inverter and said first turn-on angular position ($\theta_p$) is relatively independent of said second turn-on angular position ($\theta_m$).

11. The controller of claim 10, wherein said second monitoring part is active above said base speed, where said first peak of said phase current occurs at said second turn-on angular position ($\theta_m$), regardless of current amplitude.

12. The controller of claim 11, further comprising the step of forcing said first peak of said phase current to match a commanded phase current.

13. The controller of claim 9, wherein the desired turn-on angle is advanced or retarded automatically according to an error between said first turn-on angular position ($\theta_p$) and said second turn-on angular position ($\theta_m$).

14. The controller of claim 9, wherein said second monitoring part conducts a feed-forward control of said detected turn-on angle to speed convergence to the desired turn-on angle ($\theta_{on}$).

15. The controller of claim 9, wherein said second monitoring part further continuously monitors a first turn-on current ($I_p$) indicative of said first peak of said phase current and aligns said first turn-on current ($I_p$) with said commanded reference current ($I_{ref}$) indicative of where the inductance begins to increase.

16. The controller of claim 15, wherein said controller enters a current regulation mode if at least one of said reference current ($I_{ref}$) and a motor speed is reduced and said first turn-on angular position ($\theta_p$) occurs before said second turn-on angular position ($\theta_m$).

17. The controller of claim 9, wherein said switched reluctance motor includes:
   a hollow stator disposed about an axis and having at least one pair of opposing radially inwardly extending stator poles;
   a rotor supported within said stator about said axis concentrically with said stator for rotation relative thereto, said rotor having at least one pair of opposing radially outwardly extending rotor poles, a magnetic reluctance being defined between said rotor poles and said stator poles, said magnetic reluctance varying between a minimum reluctance when said rotor poles are radially aligned with said stator poles and a maximum reluctance when said rotor poles are not radially aligned with said stator poles;
   at least one phase winding wound about said at least one pair of said stator poles; and
   a circuit for delivering electric current from said at least one phase winding to an electric storage battery of a vehicle.

18. The controller of claim 9, wherein said switched reluctance motor includes:
   a hollow rotor disposed about an axis and having at least one pair of opposing radially inwardly extending rotor poles;
   a stator supported within said rotor about said axis concentrically with said rotor for rotation relative thereto, said stator having at least one pair of opposing radially outwardly extending stator poles, a magnetic reluctance being defined between said stator poles and said rotor poles, said magnetic reluctance varying between a minimum reluctance when said stator poles are radially aligned with said rotor poles and a maximum reluctance when said stator poles are not radially aligned with said rotor poles;
   at least one phase winding wound about said at least one pair of said rotor poles; and
   a circuit for delivering electric current from said at least one phase winding to an electric storage battery of a vehicle.

* * * * *